United States Patent
Rand et al.

(10) Patent No.: US 7,778,958 B2
(45) Date of Patent: Aug. 17, 2010

(54) RECOVERY OF DATA ON A PRIMARY DATA VOLUME

(75) Inventors: David Leroy Rand, Kihei, HI (US); Lloyd Alan Poston, Mountain View, CA (US)

(73) Assignee: Quantum Corporation, San Jose, CA (US)

( * ) Notice: Subject to any disclaimer, the term of this patent is extended or adjusted under 35 U.S.C. 154(b) by 1285 days.

(21) Appl. No.: 10/412,043

(22) Filed: Apr. 10, 2003

(65) Prior Publication Data
US 2005/0108302 A1    May 19, 2005

Related U.S. Application Data (60) Provisional application No. 60/372,050, filed on Apr. 11, 2002.

(51) Int. Cl.
*G06F 17/30* (2006.01)
(52) U.S. Cl. .................. 707/609; 707/610; 707/611; 707/620; 707/665; 707/666
(58) Field of Classification Search ............... 707/202, 707/609, 610, 611, 620, 665, 666
See application file for complete search history.

(56) References Cited

U.S. PATENT DOCUMENTS

| | | | |
|---|---|---|---|
| 5,734,818 A | | 3/1998 | Kern et al. |
| 5,794,252 A | | 8/1998 | Bailey et al. |
| 5,848,230 A | * | 12/1998 | Walker .......................... 714/7 |
| 5,889,935 A | * | 3/1999 | Ofek et al. ..................... 714/6 |
| 6,035,412 A | | 3/2000 | Tamer et al. |
| 6,163,856 A | * | 12/2000 | Dion et al. ..................... 714/4 |
| 6,173,377 B1 | * | 1/2001 | Yanai et al. ................. 711/162 |
| 6,182,198 B1 | * | 1/2001 | Hubis et al. ................. 711/162 |
| 6,366,987 B1 | | 4/2002 | Tzelnic et al. |
| 6,697,960 B1 | * | 2/2004 | Clark et al. .................... 714/15 |
| 6,871,271 B2 | * | 3/2005 | Ohran et al. ................. 711/162 |
| 6,880,086 B2 | * | 4/2005 | Kidder et al. ............... 713/191 |
| 6,912,629 B1 | * | 6/2005 | West et al. ................... 711/161 |
| 6,915,315 B2 | * | 7/2005 | Autrey et al. ............... 707/204 |
| 6,934,877 B2 | * | 8/2005 | Tamatsu ........................ 714/5 |

FOREIGN PATENT DOCUMENTS

| | | |
|---|---|---|
| EP | 0566966 A2 | 10/1993 |
| JP | 4115060 B2 | 4/2008 |

OTHER PUBLICATIONS

European Search Report mailed Oct. 12, 2007, for EP Application No. 03252333.4 filed Apr. 11, 2003, 3 pages.
European Office Action mailed Dec. 17, 2008, for EP Application No. 03252333.4 filed Apr. 11, 2003, 4 pages.
Japanese Office Action mailed Dec. 24, 2008, for Japanese Application No. 2003-108027 filed Apr. 11, 2003, 5 pages. (English translation attached, 8 pages).

* cited by examiner

*Primary Examiner*—Don Wong
*Assistant Examiner*—Thanh-Ha Dang (57) ABSTRACT

Data on a primary data volume is restored by generating an image of the primary data volume at a specified point-time based on data stored on a backup data volume, where the data stored on the backup data volume includes data written to the primary data volume and stamps to indicate when the data was written to the primary data volume. The primary data volume is restored based on the generated image of the primary data volume. Additionally, while the primary data volume is being restored, read/write requests to the primary data volume are satisfied using the generated image of the primary data volume.

28 Claims, 5 Drawing Sheets

|  | Sector (N-1) | Sector (N) | Sector (N+1) |
|---|---|---|---|
| Time (T-1) | Data (1) | Data (1) | Data (1) |
| Time (T) |  | Data (2) | Data (2) |
| Time (T+1) | Data (3) | Data (3) |  |

RECOVERY OF DATA ON A PRIMARY DATA VOLUME

CROSS-REFERENCE TO RELATED APPLICATION

This application claims priority of an earlier filed provisional application U.S. Provisional Application Ser. No. 60/372,050, titled METHOD FOR INSTANT RECOVERY OF A FAILED PRIMARY STORAGE DEVICE, filed Apr. 11, 2002, which is incorporated herein by reference in its entirety.

BACKGROUND

1. Field of the Invention

The present application generally relates to a backup system, and more particularly to recovering data on a primary data volume.

2. Related Art

In a convention backup system, data stored on a primary data volume is copied to a backup data volume as an image, which is generally referred to as a "snapshot," of the primary data volume at one particular point-in-time (i.e., the time when the image is created). If the primary data volume fails, then the image of the primary data volume stored on the backup data volume is used to restore the primary data volume. However, because the backup data volume is an image of the primary data volume at a particular point-in-time (i.e., the time when the image was created), the primary data volume can only be restored to the point-in-time when the image of the primary data volume was created.

SUMMARY

In one exemplary embodiment, data on a primary data volume is restored by generating an image of the primary data volume at a specified point-time based on data stored on a backup data volume, where the data stored on the backup data volume includes data written to the primary data volume and stamps to indicate when the data was written to the primary data volume. The primary data volume is restored based on the generated image of the primary data volume. Additionally, while the primary data volume is being restored, read/write requests to the primary data volume are satisfied using the generated image of the primary data volume.

DETAILED DESCRIPTION

The following description sets forth numerous specific configurations, parameters, and the like. It should be recognized, however, that such description is not intended as a limitation on the scope of the present invention, but is instead provided to provide a better description of exemplary embodiments.

Figure 1:
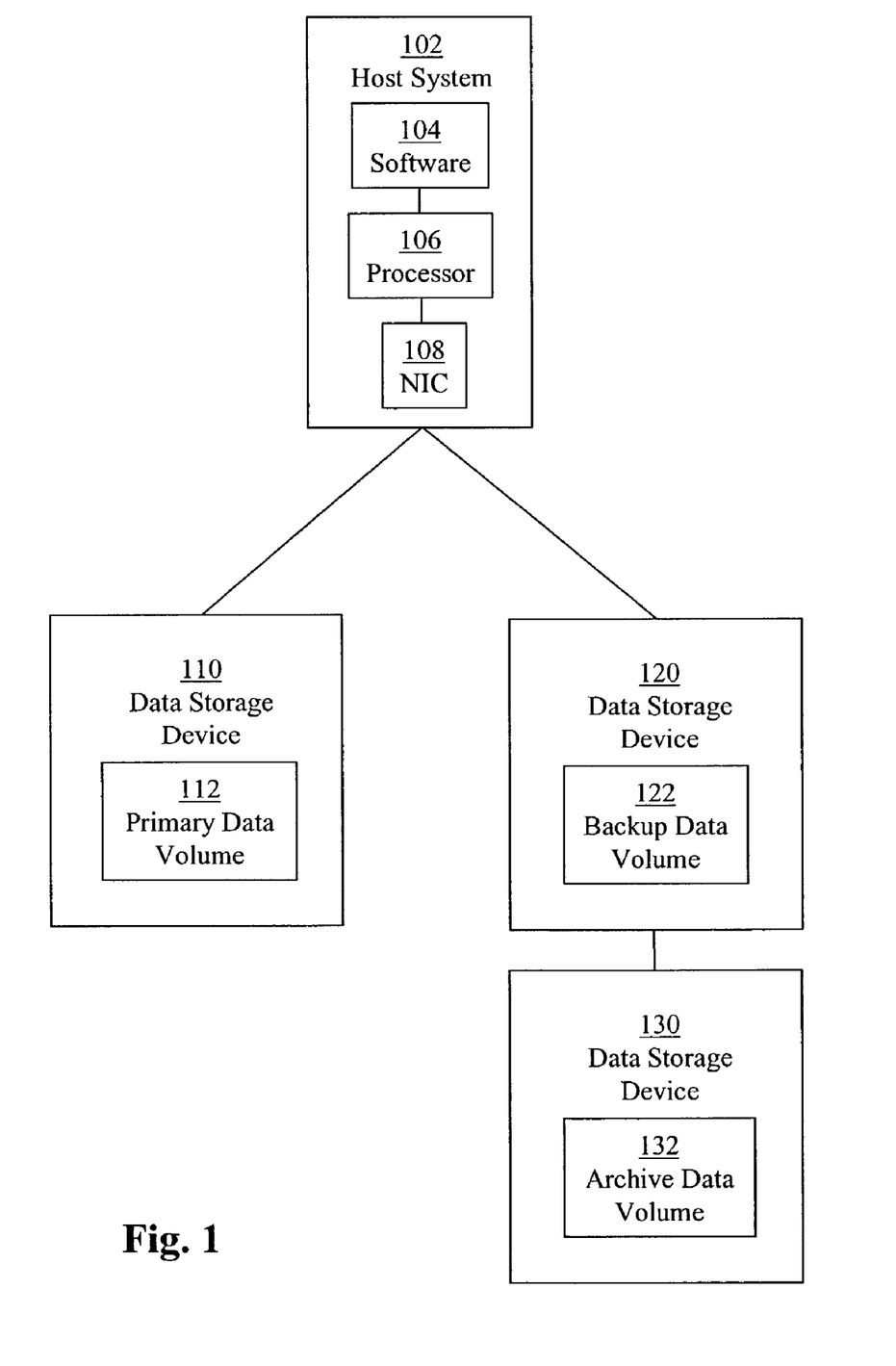
FIG. 1 depicts an exemplary host system and data storage devices.

FIG. 1 depicts an exemplary embodiment of a host system 102 connected to data storage devices 110 and 120. Host system 102 can be any type of computer, such as a personal computer, a workstation, a server, and the like. Data storage devices 110 and 120 can be various types of devices capable of storing data, such as hard drives, tape drives, various removable media, writeable CD-ROMs, Write Once Read Many (WORMs) flash memories, Electrically Erasable Programmable Read Only Memories (EEPROMs), and the like. Data storage devices 110 and 120 can be any combination of two or more types of devices. Additionally, data storage devices 110 and 120 can be a single device or multiple devices. For example, data storage device 110 can include two or more hard drives. Similarly, data storage device 120 can be a redundant array of inexpensive/independent disks (RAID) system, such as a RAID array level 0, 1, and/or 5.

As depicted in FIG. 1, data storage device 110 includes a primary data volume 112, and data storage device 120 includes a backup data volume 122. In the present exemplary embodiment, host system 102 writes/stores data on and reads/retrieves data from primary data volume 112. As described below, the data stored on primary data volume 112 is backed-up on data storage device 120 by storing the data written to primary data volume 112 on backup data volume 122.

In conventional mirroring backup schemes, primary data volume 112 in data storage device 110 is backed-up on data storage device 120 by storing an image, which is generally referred to as a "snapshot," of primary data volume 112 as backup data volume 122 in data storage device 120. Thus, if primary data volume 112 needs to be restored, the image of primary data volume 112 stored as backup data volume 122 in data storage device 120 can be copied back to data storage device 110 from data storage device 120. For example, if data storage device 110 fails, then data storage device 110 can be replaced and the primary data volume 112 can be restored by copying the image of primary data volume 112 stored as backup data volume 122 in data storage device 120.

In the present exemplary embodiment, rather than storing images of primary data volume 112, a continuous backup scheme is used to backup primary data volume 112 on data storage device 120. More particularly, when data is written to primary data volume 112, the data is also written to backup data volume 122. Before writing the data to backup data volume 122, the data is stamped to indicate when the data was written. For example, data being written to backup data volume 122 can be stamped using a timestamp. For a more detailed description of an exemplary continuous backup scheme, see U.S. patent application Ser. No. 09/588,242, titled DATA STORAGE SYSTEM AND PROCESS, incorporated herein by reference in its entirety.

In the present exemplary embodiment, because images of primary data volume 112 are not stored in backup data volume 122, when primary data volume 112 needs to be restored, an image of primary data volume 112 to be restored is created based on data stored on backup data volume 122. Additionally, as described above, the data stored on backup data volume 122 was stamped to indicate when the data was written. Thus, in the present exemplary embodiment, the primary data volume 112 can be restored to a state at a specified point-in-time by creating the image of the primary data volume 112 based on the data stored on backup data volume 122 using the stamp used to indicate when the data was written.

Figure 2:
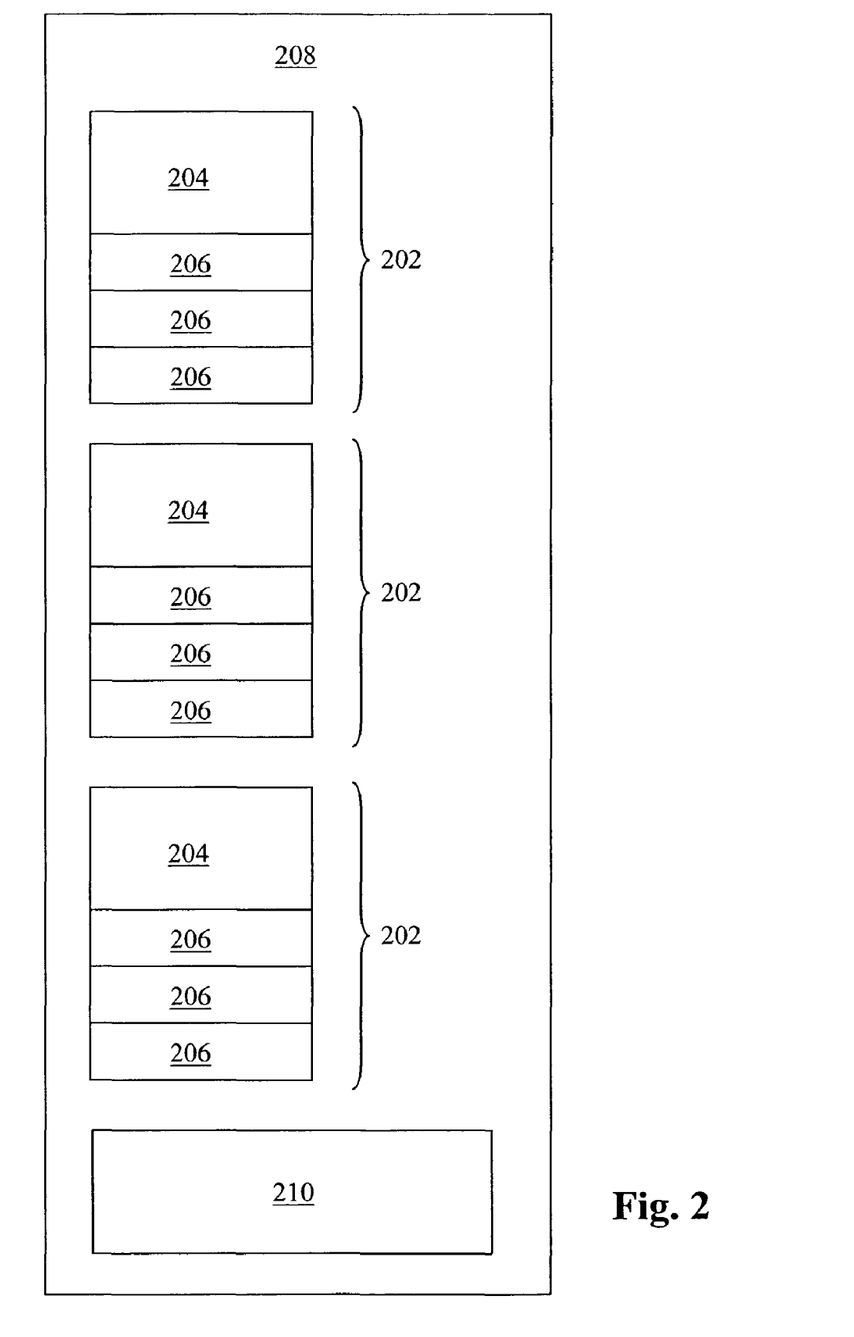
FIG. 2 depicts an exemplary data structure of an exemplary backup data volume.

For example, FIG. 2 depicts an exemplary data structure of backup data volume 122 (FIG. 1). More particularly, the exemplary data structure includes a data storage element 202, which includes a data map 204 and one or more data blocks 206. It should be recognized that data storage element 202 can include any number of data blocks 206.

In the present exemplary data structure, a data block 206 is used to store the data or a portion of the data written to primary data volume 112 (FIG. 1), which is being backed-up on backup data volume 122 (FIG. 1). As described above, before writing data to backup data volume 122 (FIG. 1), the data is stamped to indicate when the data was written. Thus, in the present exemplary data structure, map 204 is used to store the association of a particular data block 206 with the stamp used to indicate when the data corresponding to the particular data block 206 was written. Additionally, map 204 is used to store the association of a particular data block 206 and the location within primary data volume 112 (FIG. 1) in which the data associated with the particular data block 206 was written.

For example, when a timestamp is used as the stamp to indicate when data was written and data storage device 110 (FIG. 1) is a hard drive, map 204 stores the association of a particular data block 206 to a timestamp and a sector location within data storage device 110 (FIG. 1). More particularly, with reference to FIG. 3, assume that at time (T−1), data (1) is written to sector (N−1), (N), and (N+1) of primary data volume 112 (FIG. 1). As such, with reference to FIG. 4, data (1) is also written to backup data volume 122 (FIG. 1). As described above, when data (1) is written to backup data volume 122 (FIG. 1), a stamp is used to indicate when data (1) was written (in this example, time (T−1)). As also described above, data (1) is stored in backup data volume 122 (FIG. 1) in one or more data blocks 206 of a data storage element 202. Note that data (1) is not necessarily written to the same sectors in backup data volume 122 (FIG. 1) as primary data volume 112 (FIG. 1). The association of the stamp used to indicate when data (1) was written (in this example, time (T−1)), data block 206 in which data (1) is stored, the location within primary data volume 112 (FIG. 1) in which data (1) was written (in this example, sectors (N−1), (N), and N+1) is stored in map 204. Although FIG. 4 depicts all of data (1) being stored within a single data bock 206, it should be recognized that data (1) can be stored in two or more data blocks 206.

Figure 3:
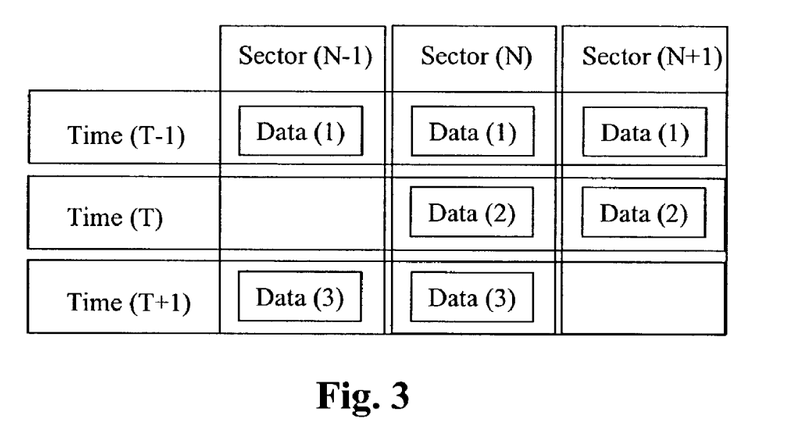
FIG. 3 depicts an exemplary map for data stored in an exemplary backup data volume.

With reference to FIG. 3, assume that at time (T), data (2) is written to sectors (N) and (N+1) of primary data volume 112 (FIG. 1). Thus, the portions of data (1) in sectors (N) and (N+1) are overwritten in primary data volume 112 (FIG. 1). However, with reference to FIG. 4, in backup data volume 122 (FIG. 1), data (2) is stored in one or more data blocks 206 of data storage element 202 without necessarily overwriting data (1). The association of the stamp used to indicate when data (2) was written (in this example, time (T)), data block 206 in which data (2) is stored, the location within primary data volume 112 (FIG. 1) in which data (2) was written (in this example, sectors (N) and (N+1)) is stored in map 204.

With reference again to FIG. 3, now assume that at time (T+1), data (3) is written to sectors (N−1) and (N) of primary data volume 112 (FIG. 1). Thus, the portion of data (1) in sector (N−1) and the portion of data (2) in sector (N) are overwritten in primary data volume 112 (FIG. 1). However, with reference to FIG. 4, in backup data volume 122 (FIG. 1), data (3) is stored in one or more data blocks 206 of data storage element 202 without necessarily overwriting data (1) and/or data (2). The association of the stamp used to indicate when data (3) was written (in this example, time (T+1)), data block 206 in which data (3) is stored, the location within primary data volume 112 (FIG. 1) in which data (3) was written (in this example, sectors (N−1) and (N)) is stored in map 204.

Figure 4:
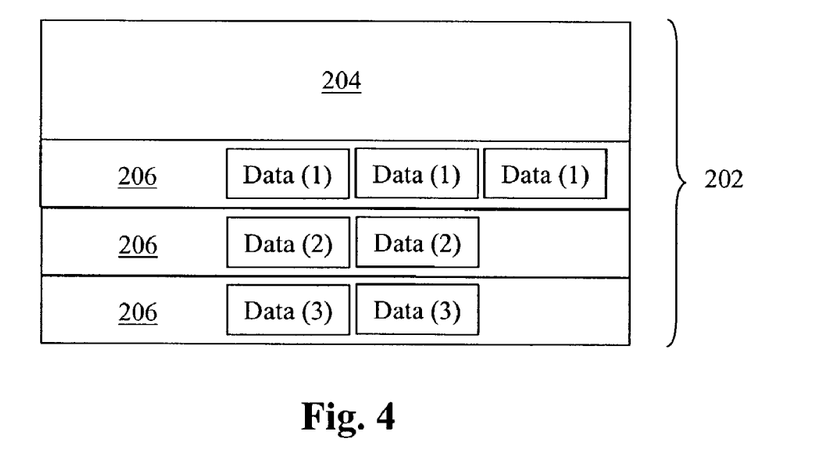
FIG. 4 depicts an exemplary data storage element in an exemplary backup data volume.

As depicted in FIG. 4, because data is stored on backup data volume 122 (FIG. 1) without overwriting the previously written data (e.g., data (2) is written without overwriting data (1)), rather than restoring primary data volume 112 (FIG. 1) only to a most recent state, primary data volume 112 (FIG. 1) can be restored to a state at a specified point-in-time based on the data stored on backup data volume 122 (FIG. 1) using the stamp used to indicate when data is written.

For example, if time (T) is specified, an image of primary data volume 112 (FIG. 1) at time (T) is created based on data stored in backup data volume 122 (FIG. 1). More particularly, map 204 of data storage element 202 can be used to determine the data blocks 206 in data storage element 202 having associated stamps appropriate for the specified point-in-time (i.e., time (T)). In this example, the first two data blocks 206, which are associated with time (T−1) and time (T), are appropriate, but the third data block 206 in data storage element 202, which is associated with time (T+1), is not appropriate. Additionally, based on map 204, it can be determined that data (1) was written to sectors (N−1), (N), and (N+1) at time (T−1) and data (2) was written to sectors (N) and (N+1). Thus, in creating the image of primary data volume 112 (FIG. 1) at time (T), the portion of data (1) in sector (N−1) can be included or omitted.

With reference to FIG. 2, the present exemplary data structure of backup data volume 122 (FIG. 1) can include a hierarchic structure. For example, the exemplary data structure can include a plurality of data storage elements 202 grouped into a set of data storage elements 208. As depicted in FIG. 2, set of data storage elements 208 includes a map 210, which is a merge of maps 204 of the data storage elements 202 within set of data storage elements 208. Thus, when an image of primary data volume 112 (FIG. 1) is created for a specified time, map 210 can be used to determine which data storage elements 202 within set of data storage elements 208 include data appropriate for the specified point-in-time. In this manner, the image of primary data volume 112 (FIG. 1) can be created in a shorter period of time using a hierarchy of maps (e.g., maps 204 of data storage elements 202 and map 210 of set of data storage elements 208) than directly examining maps 204 in individual data storage elements 202. It should be recognized that backup data volume 122 (FIG. 1) can include additional levels in the hierarchy of maps.

Alternatively, the image of primary data volume 112 (FIG. 1) can be created without using maps 204. For example, the data written to primary data volume 112 (FIG. 1), the stamp used to indicate when data was written, and the location in primary data volume 112 (FIG. 1) where the data was written can be stored together as a data block in backup data volume 122 (FIG. 1). When the image of primary data volume 112 (FIG. 1) is created, the data blocks in backup data volume 122 (FIG. 1) can be examined, and more particularly the stamps used to indicate when data was written for the data blocks.

Figure 5:
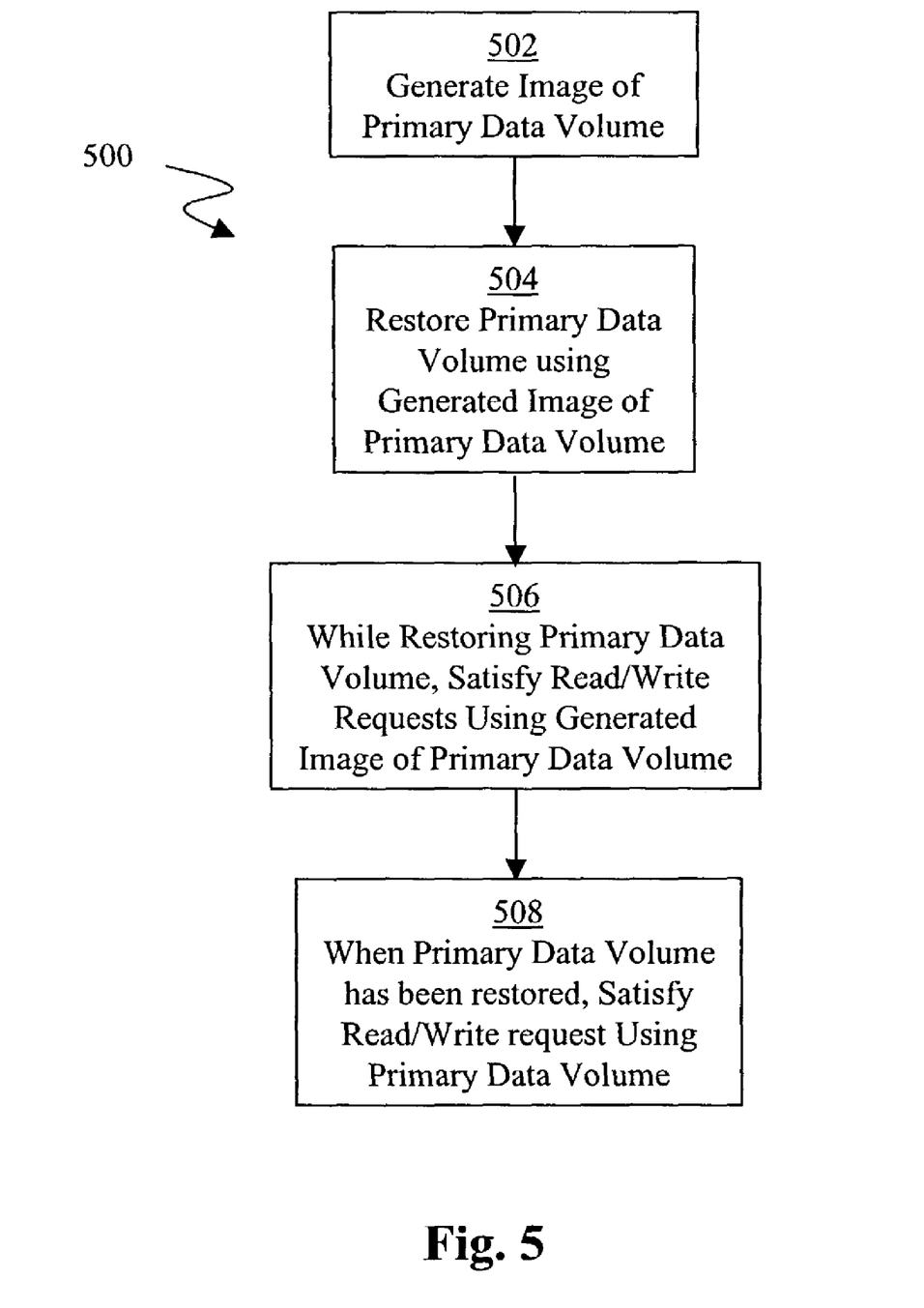
FIG. 5 depicts an exemplary process of restoring a primary data volume using a backup data volume while satisfying read/write requests to the primary data volume.

With reference to FIG. 5, an exemplary process 500 is depicted for restoring primary data volume 112 (FIG. 1). In accordance with exemplary process 500, primary data volume 112 (FIG. 1) is restored while continuing to satisfy read and write requests from host system 102 (FIG. 1).

Process 500 can be initiated when a fault is detected with primary data volume 112 (FIG. 1) or data storage device 110 (FIG. 1). For example, when a user/administrator detects a fault in accessing data on primary data volume 112 (FIG. 1), the user/administrator can manually initiate process 500.

Alternatively, an application can automatically initiate process 500. Additionally, the user/administrator or application can specify a point-in-time to which primary data volume 112 (FIG. 1) should be restored.

In step 502, a virtual representation (i.e., an image) of primary data volume 112 (FIG. 1) at a specified point-in-time is generated. As described above, with reference to FIG. 1, in the present exemplary embodiment, the image of primary data volume 112 can be generated based on data stored in backup data volume 122. More particularly, as also described above, data stored in backup data volume 122 is stamped to indicate when the data was written. As such, an image of primary data volume 112 at a specified point-in-time can be generated using the stamps to determine the appropriate data in backup data volume 122. Additionally, the data in backup data volume 122 can be stored in data blocks in data elements, where a map within a data element stores the association of a data block within the data element to a stamp that indicates when the data in the data block was written. Thus, the maps in data elements can be used to generate the image of primary data volume 112 at a specified point-in-time.

In step 504 (FIG. 5), the generated image of primary data volume 112 is used to restore primary data volume 112 on data storage device 110. More particularly, primary data volume 112 can be compared to the generated image of primary data volume 112 to determine data that has been lost or corrupted in primary data volume 112. Data that has been lost or corrupted in primary data volume 112 can be restored to primary data volume 112 from backup data volume 122. If the entire primary data volume 112 needs to be restored, such as if data storage device 110 has failed, then the data associated with the generated image of primary data volume 112 can be restored from data storage device 120. Note that if data storage device 110 has failed requiring the entire primary data volume 112 to be restored, the primary data volume 112 does not need to be compared to the generated image of primary data volume 112.

In step 506 (FIG. 5), while the primary data volume 112 is being restored, read and write requests for data in primary data volume 112 that have not been restored are satisfied using the generated image of primary data volume 112. For example, if host system 102 issues a read request for data that has not yet been restored to primary data volume 112, then the read request is satisfied by using the generated image of primary data volume 112. If the data has been restored, then the read request is satisfied by the primary data volume 112. To determine what data has been restored, a log can be maintained of data that needs to be restored to primary data volume 112. If host system 102 issues a write request to the primary data volume 112 and data storage device 110 is inactive, such as if data storage device 110 has failed, then the write request is satisfied by data storage device 120 using the generated image of primary data volume 112. If data storage device 110 is active, then the write request is satisfied by data storage device 110.

In step 508 (FIG. 5), when the primary data volume 112 has been restored, read and write requests are satisfied by primary data volume 112. For example, as described above, a log of data that needs to be restored to primary data volume 112 can be maintained, and when the log is completed, the restoration of primary data volume 112 has also been completed.

It should be recognized that exemplary process 500 can include any number of additional steps not depicted in FIG. 5. It should also be recognized that process 500 can be implemented as a computer program, which includes computer executable instructions to direct the operation of host system 102 (FIG. 1) and/or data storage device 110 (FIG. 1) and/or data storage device 120 (FIG. 1). For example, with reference to FIG. 1, process 500 (FIG. 5) can be a routine within backup software 104 to direct the operation of processor 106. Exemplary process 500 (FIG. 5) can also be implemented in hardware, such as in an Application-Specific Integrated Circuit (ASIC), or a combination of software and hardware.

Figure 6:
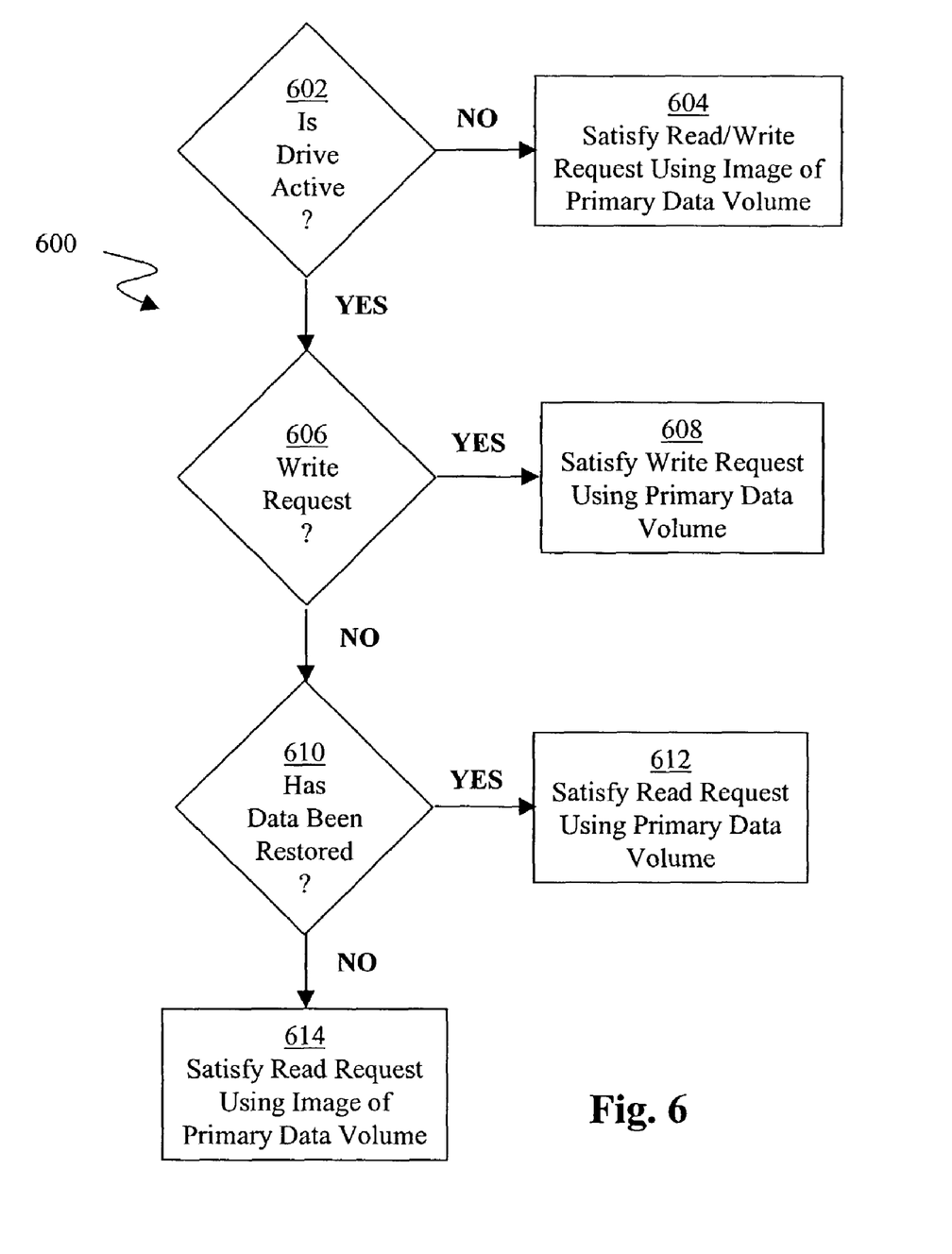
FIG. 6 depicts in more detail an aspect of the exemplary process depicted in FIG. 5.

FIG. 6 depicts in more detail an exemplary process 600 of satisfying read and write requests to primary data volume 112 while the primary data volume 112 is being restored. In step 602, a determination is made as to whether the data storage drive having the primary data volume is active. If the data storage device is not active, then in step 604, the read/write requests to the primary data volume are satisfied using the generated image of the primary data volume. If the data storage device is active, then in step 606, a determination is made as to whether the request is a write request. If the request is a write request, then in step 608 the write request is satisfied by the primary data volume. If the request is not a write request, then the request is a read request and in step 610 a determination is made as to whether the data being requested has been restored to the primary data volume. If the data has been restored, then in step 612 the read request is satisfied by the primary data volume. If the data has not been restored, then in step 614 the read request is satisfied by the image of the primary data volume.

It should be recognized that exemplary process 600 can include any number of additional steps not depicted in FIG. 6. It should also be recognized that process 600 can be implemented as a computer program, which includes computer executable instructions to direct the operation of host system 102 (FIG. 1) and/or data storage device 110 (FIG. 1) and/or data storage device 120 (FIG. 1). For example, with reference to FIG. 1, process 600 (FIG. 6) can be a routine within backup software 104 to direct the operation of processor 106. Exemplary process 600 (FIG. 6) can also be implemented in hardware, such as in an Application-Specific Integrated Circuit (ASIC), or a combination of software and hardware.

With reference to FIG. 1, it should be recognized that primary data volume 112 can be a portion of a single data storage device 110 or span multiple data storage devices 110. Similarly, backup data volume 122 can be a portion of a single data storage device 120 or span multiple data storage devices 120. Additionally, the configuration of primary data volume 112 and backup data volume 122 need not be identical to each other. For example, primary data volume 112 can be a portion of a single data storage device 110, such as a partition of a high-capacity hard disk, while backup data volume 122 can span multiple data storage devices 120, such as a RAID system.

As depicted in FIG. 1, host system 102 can include backup software 104 and processor 106. In the present exemplary embodiment, backup software 104 and processor 106 are configured to control the backup operation of host system 102. It should be recognized, however, that host system 102 can include various components, both hardware and software, that are not depicted in FIG. 1.

Additionally, data stored in backup data volume 122 can be subsequently transferred to archive data volume 132 in data storage device 130. Although FIG. 1 depicts data storage device 130 connected to data storage device 120, it should be recognized that data storage device 130 can be connected to host system 102.

As also depicted in FIG. 1, host system 102 includes a network interface card (NIC) 108. Thus, host system 102 and data storage device(s) 110, 120, and/or 130 can be remotely connected, such as through a local area network (LAN), a wide area network (WAN), a storage area network (SAN), the Internet, and the like. It should be recognized, however, that host system 102 and data storage device(s) 110, 120, and/or 130 can be directly connected, such as through a physical cable.

Additionally, it should also be recognized that host system 102 and data storage device(s) 110, 120, and/or 130 can be housed in a single housing. For example, host system 102 and data storage device(s) 110, 120, and/or 130 can be components of a single computer system.

Although exemplary embodiments have been described, various modifications can be made without departing from the spirit and/or scope of the present invention. Therefore, the present invention should not be construed as being limited to the specific forms shown in the drawings and described above.

We claim:

1. A method of restoring data on a primary data volume, the method comprising:
   generating an image of the primary data volume at a specified point-in-time based on data stored on a backup data volume,
   wherein the data stored on the backup data volume includes data written to the primary data volume and stamps to indicate when the data was written to the primary data volume;
   restoring the primary data volume based on the generated image of the primary data volume; and
   while the primary data volume is being restored, satisfying read/write requests to the primary data volume using the generated image of the primary data volume rather than the primary data volume.

2. The method of claim 1, wherein the stamps include time stamps.

3. The method of claim 1, wherein the data stored on the backup data volume is not an image of the primary data volume.

4. The method of claim 1, wherein the backup data volume has a data structure comprising:
   data storage elements, wherein a data storage element includes:
      data blocks, wherein data written to the primary data volume is stored within a data block; and
      a map containing associations between data blocks and stamps used to indicate when data stored in the data blocks were written to the primary data volume.

5. The method of claim 4, wherein the map contains associations between data blocks and locations in the primary drive where data stored in the data blocks were written.

6. The method of claim 4, wherein generating an image of the primary data volume comprises:
   accessing the map in the data storage element to identify one or more data blocks having data appropriate for the specified point-in-time.

7. The method of claim 4, wherein the data structure further comprises:
   sets of data storage elements, wherein a set of data storage elements includes:
      a plurality of data storage elements; and
      a map of the maps of the data storage elements within the set of data storage elements.

8. The method of claim 7, wherein generating an image of the primary data volume comprises:
   accessing the map within the set of data storage elements to identify one or more data blocks having data appropriate for the specified point-in-time.

9. The method of claim 1, wherein restoring comprises:
   sending data from the backup data volume to the primary data volume.

10. The method of claim 1, wherein satisfying read/write requests comprises:
    determining whether a data storage device having the primary data volume is active;
       if the data storage device is not active, satisfying read/write requests using the generated image of the primary data volume.

11. The method of claim 10 further comprising:
    if the data storage device is determined to be active and the read/write request is a write request, satisfying the write request using the primary data volume.

12. The method of claim 10 further comprising:
    if the data storage device is determined to be active and the read/write request is a read request, determining whether the data being requested has been restored to the primary data volume;
       if the data has been restored to the primary data volume, satisfying the read request using the primary data volume; and
       if the data has not been restored to the primary data volume, satisfying the read request using the generated image of the primary data volume.

13. A system of restoring data on a primary data volume connected to a host system, the system comprising:
    a backup data volume configured to be connected to the host system,
    wherein the backup data volume stores data written to the primary data volume by the host system, and
    wherein to restore the primary data volume:
       an image of the primary data volume at a specified point-in-time is generated based on the data stored on the backup data volume,
       data stored on the backup data volume is sent to the primary data volume based on the generated image of the primary data volume, and
       while the primary volume is being restored, read/write requests to the primary data volume are satisfied using the generated image of the primary data volume rather than the primary data volume.

14. The system of claim 13, wherein data stored on the backup volume includes a stamp to indicate when the data was written to the primary data volume.

15. The system of claim 14, wherein the backup data volume has a data structure comprising:
    data storage elements, wherein a data storage element includes:
       data blocks, wherein data written to the primary data volume is stored within a data block; and
       a map containing associations between data blocks and stamps used to indicate when data stored in the data blocks were written to the primary data volume.

16. The system of claim 15, wherein the map contains associations between data blocks and locations in the primary drive where data stored in the data blocks were written.

17. The system of claim 15, wherein the image of the primary data volume is generated by accessing the map in the data storage element to identify one or more data blocks having data appropriate for the specified point-in-time.

18. The system of claim 15, wherein the data structure further comprises:
    sets of data storage elements, wherein a set of data storage elements includes:
       a plurality of data storage elements; and a map of the maps of the data storage elements within the set of data storage elements.

19. The system of claim 18, wherein the image of the primary data volume is generated by accessing the map within the set of data storage elements to identify one or more data blocks having data appropriate for the specified point-in-time.

20. The system of claim 13, wherein read/write requests to the primary data volume are satisfied by:
   determining whether a data storage device having the primary data volume is active;
      if the data storage device is not active, satisfying read/write requests using the generated image of the primary data volume;
      if the data storage device is determined to be active and the read/write request is a write request, satisfying the write request using the primary data volume;
      if the data storage device is determined to be active and the read/write request is a read request, determining whether the data being requested has been restored to the primary data volume;
         if the data has been restored to the primary data volume, satisfying the read request using the primary data volume; and
         if the data has not been restored to the primary data volume, satisfying the read request using the generated image of the primary data volume.

21. A computer-readable storage medium with computer program instructions to cause the performing of a process comprising:
   generating an image of the primary data volume at a specified point-in-time based on data stored on a backup data volume;
   restoring the primary data volume based on the generated image of the primary data volume; and
   while the primary data volume is being restored, satisfying read/write requests to the primary data volume using the generated image of the primary data volume rather than the primary data volume.

22. The computer-readable storage medium of claim 21, wherein data stored on the backup volume includes a stamp to indicate when the data was written to the primary data volume.

23. The computer-readable storage medium of claim 22, wherein the backup data volume has a data structure comprising:
   data storage elements, wherein a data storage element includes:
      data blocks, wherein data written to the primary data volume is stored within a data block; and
      a map containing associations between data blocks and stamps used to indicate when data stored in the data blocks were written to the primary data volume.

24. The computer-readable storage medium of claim 23, wherein the map contains associations between data blocks and locations in the primary drive where data stored in the data blocks were written.

25. The computer-readable storage medium of claim 23, wherein generating an image of the primary data volume comprises:
   accessing the map in the data storage element to identify one or more data blocks having data appropriate for the specified point-in-time.

26. The computer-readable storage medium of claim 23, wherein the data structure further comprises:
   sets of data storage elements, wherein a set of data storage elements includes:
      a plurality of data storage elements; and
      a map of the maps of the data storage elements within the set of data storage elements.

27. The computer-readable storage medium of claim 23, wherein generating an image of the primary data volume comprises:
   accessing the map within the set of data storage elements to identify one or more data blocks having data appropriate for the specified point-in-time.

28. The computer-readable storage medium of claim 21, wherein satisfying read/write requests to the primary data volume comprises:
   determining whether a data storage device having the primary data volume is active;
      if the data storage device is not active, satisfying read/write requests using the generated image of the primary data volume;
      if the data storage device is determined to be active and the read/write request is a write request, satisfying the write request using the primary data volume;
      if the data storage device is determined to be active and the read/write request is a read request, determining whether the data being requested has been restored to the primary data volume;
         if the data has been restored to the primary data volume, satisfying the read request using the primary data volume; and
         if the data has not been restored to the primary data volume, satisfying the read request using the generated image of the primary data volume.

* * * * *

UNITED STATES PATENT AND TRADEMARK OFFICE
CERTIFICATE OF CORRECTION

| | | |
|---|---|---|
| PATENT NO. | : 7,778,958 B2 | Page 1 of 1 |
| APPLICATION NO. | : 10/412043 | |
| DATED | : August 17, 2010 | |
| INVENTOR(S) | : Rand et al. | |

It is certified that error appears in the above-identified patent and that said Letters Patent is hereby corrected as shown below:

Background:

In column 1, line 21, delete "convention" and insert --conventional--.

Signed and Sealed this

Ninth Day of November, 2010

David J. Kappos
*Director of the United States Patent and Trademark Office*